United States Patent
Nguy et al.

(10) Patent No.: US 7,079,345 B1
(45) Date of Patent: Jul. 18, 2006

(54) DEMAGNETIZATION OF MAGNETIC MEDIA FOR DATA STORAGE DEVICE USING GRADUALLY REDUCED MAGNETIC FIELD

(75) Inventors: Hai Chi Nguy, San Jose, CA (US); Steven Lambert, San Jose, CA (US); Steven Marshall, Northboro, MA (US); George H. Bellesis, Jefferson, MA (US)

(73) Assignee: Maxtor Corporation, Longmont, CO (US)

( * ) Notice: Subject to any disclaimer, the term of this patent is extended or adjusted under 35 U.S.C. 154(b) by 245 days.

(21) Appl. No.: 10/054,355

(22) Filed: Jan. 17, 2002

(51) Int. Cl.
*G11B 5/09* (2006.01)

(52) U.S. Cl. .............................. 360/66; 360/55; 360/62; 335/209; 335/284; 361/267; 361/143; 361/149; 361/159

(58) Field of Classification Search .................. 360/66, 360/39, 55, 62, 31, 46, 266.8, 264.9, 256.2; 361/149, 143, 154, 267; 335/209, 284
See application file for complete search history.

(56) References Cited

U.S. PATENT DOCUMENTS

| | | | | |
|---|---|---|---|---|
| 3,895,270 A | * | 7/1975 | Maddox | 361/149 |
| 5,132,860 A | * | 7/1992 | Von Stein | 360/66 |
| 6,570,727 B1 | * | 5/2003 | Tamura et al. | 360/66 |
| 6,594,099 B1 | * | 7/2003 | Serizawa | 360/66 |
| 6,747,823 B1 | * | 6/2004 | Saito et al. | 360/66 |

FOREIGN PATENT DOCUMENTS

| | | | |
|---|---|---|---|
| JP | 59-229704 | * | 12/1984 |
| JP | 07-029106 | * | 1/1995 |

* cited by examiner

*Primary Examiner*—David Hudspeth
*Assistant Examiner*—Natalia Figueroa
(74) *Attorney, Agent, or Firm*—Tejpal S. Hansra

(57) ABSTRACT

Demagnetizing magnetic media for recording data in a data storage device includes placing the magnetic media in a magnetic field at a first strength, and gradually reducing the magnetic field to a second strength to essentially eliminate net magnetization in the magnetic media.

70 Claims, 9 Drawing Sheets

TIME

TIME

DEMAGNETIZATION OF MAGNETIC MEDIA FOR DATA STORAGE DEVICE USING GRADUALLY REDUCED MAGNETIC FIELD

FIELD OF THE INVENTION

The present invention relates to magnetic recording, and in particular to demagnetization of magnetic media.

BACKGROUND OF THE INVENTION

Data storage devices often use magnetic recording to store data on magnetic media. For instance, a disk drive includes a transducer head and a magnetic disk. The transducer head includes a read element that magnetically reads data from the disk and a write element that magnetically records (writes) data on the disk. The disk is magnetic media that stores the data in concentric tracks.

In longitudinal recording, data is stored on the disk in horizontal transitions (bits) that are parallel to the disk. In perpendicular recording, data is stored on the disk in vertical transitions (bits) that are perpendicular to the disk. Perpendicular recording allows for greater data storage than longitudinal recording since data stored at high areal density degrades less over time in perpendicular recording than in longitudinal recording.

In perpendicular recording, the write element includes a large pole and a small pole, and the large pole has larger dimensions than the small pole. The disk includes a soft underlayer that collects the magnetic field from a large area and couples the magnetic field to the large pole. As a result, the transducer head is biased during write operations due to the magnetic field from other tracks being coupled to the large pole. The bubble, where data is written to the disk, either expands or contracts due to the magnetic field.

Disk preconditioning plays a major role in disk drive performance. Disk preconditioning involves demagnetizing (erasing) the disk before data is recorded on the disk. Disk drive performance includes bit error rate (BER) represented by the number of bits in error read from the disk in a readback signal divided by the number of bits read from the disk in the readback signal.

DC erase applies an essentially constant current to the write element to demagnetize the disk. DC erase is typically applied to disk areas for servo wedges and user data before data is recorded on the disk. Thereafter, data such as servo patterns and user data is initially recorded on the disk.

DC erase in longitudinal recording has negligible effects since the disk lacks a soft underlayer. However, in perpendicular recording, DC erase increases the BER in the readback signal from the recorded data by up to two orders of magnitude since the soft underlayer couples the magnetic field from the DC erased area to the write element as the data is written to the disk. The magnetic coupling enhances one polarity of the writing and degrades the other such that the positive or negative bit cells last longer than the other. Thus, the magnetic coupling causes transition shift on the disk. The transition shift creates timing asymmetry during read operations, and the timing asymmetry degrades the BER. As a result, the DC erase has a large negative impact on disk drive performance.

There is, therefore, a need for an improved technique for demagnetizing the magnetic media for a data storage device that reduces or eliminates the effect of the adjacent magnetic field on the data that is subsequently written to the magnetic media.

SUMMARY OF THE INVENTION

The present invention provides an AC erase to precondition magnetic media and minimize the effect of the adjacent magnetic field on the data that is subsequently written to the magnetic media.

In an embodiment, demagnetizing magnetic media for recording data in a data storage device includes placing the magnetic media in a magnetic field at a first strength level, and gradually reducing the magnetic field to a second strength level to essentially eliminate net magnetization in the magnetic media.

In another embodiment, demagnetizing magnetic media for recording data in a data storage device includes determining a recording frequency for writing on the magnetic media at which the amplitude of a readback signal is essentially at noise level, and writing on the magnetic media at essentially the recording frequency to essentially eliminate net magnetization in the magnetic media.

In another embodiment, demagnetizing magnetic media for recording data in a data storage device includes selecting multiple consecutive tracks on the magnetic media, and writing on the magnetic media by alternating the polarity of the write current from one track to the next to essentially eliminate net magnetization in the magnetic media.

Advantageously, the AC erase improves both servo operation and BER compared to conventional DC erase.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1:
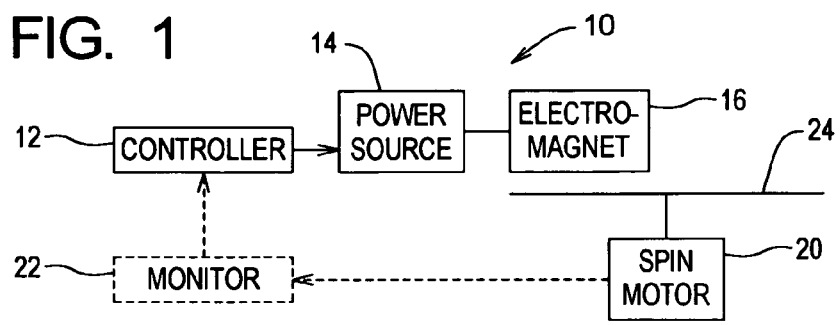
FIG. 1 shows an apparatus for AC bulk erase of a disk.

FIG. 1 shows an apparatus 10 for AC bulk erase of a disk 24. The apparatus 10 includes a controller 12, a power source 14, an electromagnet 16, a spin motor 20 and a monitor 22. The disk 24 is perpendicular recording magnetic media with an areal density of 50 Gb/in$^2$. The disk 24 is placed on the spin motor 20, and the electromagnet 16 is positioned near the disk 24.

The controller 12 controls the current generated by the power source 14 (a programmable direct current source) and thereby controls the magnetic field generated by the electromagnet 16. The spin motor 20 rotates the disk 24. The monitor 22 monitors the rotational speed of the disk 24, and the controller 12 decrements the magnetic field to zero based on the rotational speed of the disk 24. Alternatively, the monitor 22 is omitted, and the controller 12 decrements the magnetic field to zero based on a predetermined rotational speed of the disk 24.

Figure 2A:
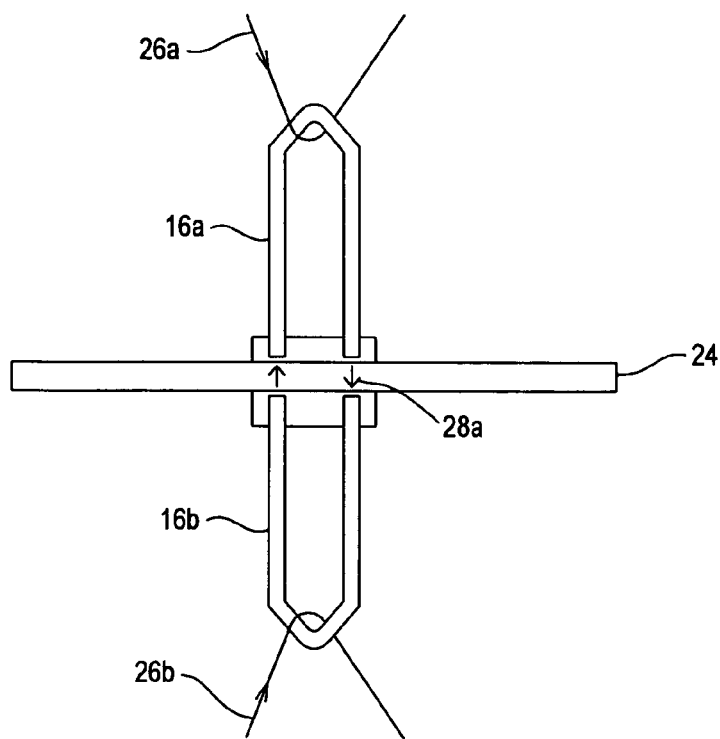
FIGS. 2A and 2B show a first configuration of an electromagnet in the apparatus of FIG. 1.
Figure 2B:
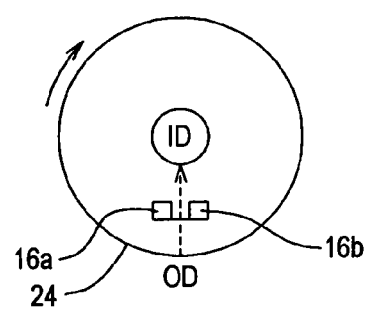

FIGS. 2A and 2B show a first configuration of the electromagnet 16 shown as electromagnets 16a and 16b. The electromagnets 16a and 16b are U-shaped magnets positioned near opposite major surfaces of the disk 24 with poles that are perpendicular to the disk 24 and a gap between the poles that is spaced from the disk 24. The electromagnets 16a and 16b are coupled to coils 26a and 26b, respectively, and generate a magnetic field 28a that is perpendicular to and extends through the disk 24. The electromagnets 16a and 16b cover a radial section of the disk 24 between the inner diameter (ID) and the outer diameter (OD) of the disk 24 and move from the ID to the OD (or the OD to the ID) to cover the entire width of the disk 24.

Figure 3A:
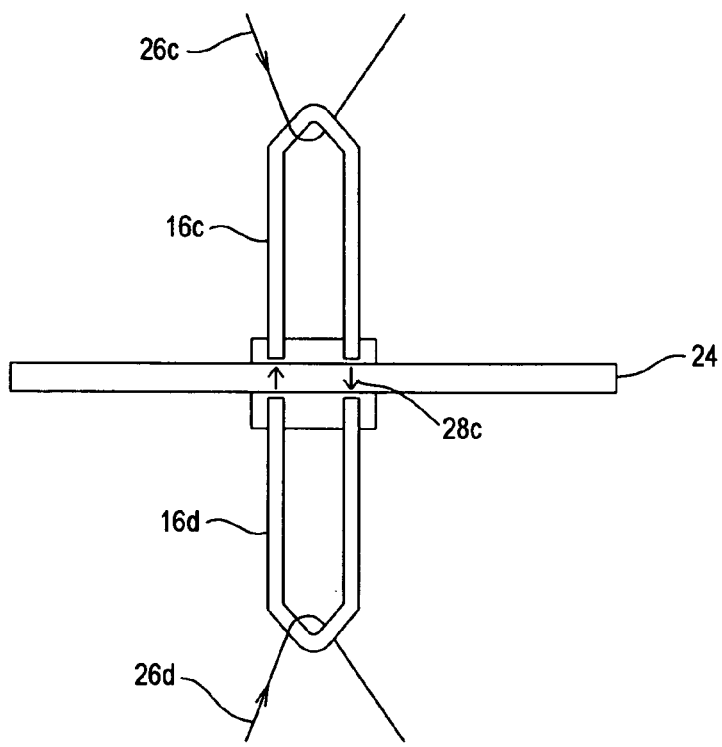
FIGS. 3A and 3B show a second configuration of an electromagnet in the apparatus of FIG. 1.
Figure 3B:
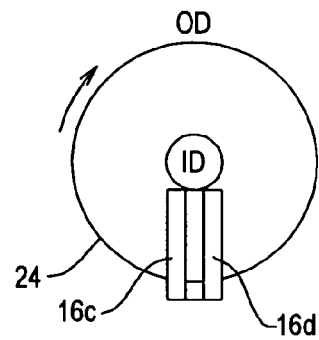

FIGS. 3A and 3B show a second configuration of the electromagnet 16 shown as electromagnets 16c and 16d. The electromagnets 16c and 16d are U-shaped magnets positioned near opposite major surfaces of the disk 24 with poles that are perpendicular to the disk 24 and a gap between the poles that is spaced from the disk 24. The electromagnets 16c and 16d are coupled to coils 26c and 26d, respectively, and generate a magnetic field 28c that is perpendicular to and extends through the disk 24. The electromagnets 16c and 16d cover a radial section of the disk 24 between the ID and the OD of the disk 24 and cover the entire width of the disk 24.

Figure 4A:
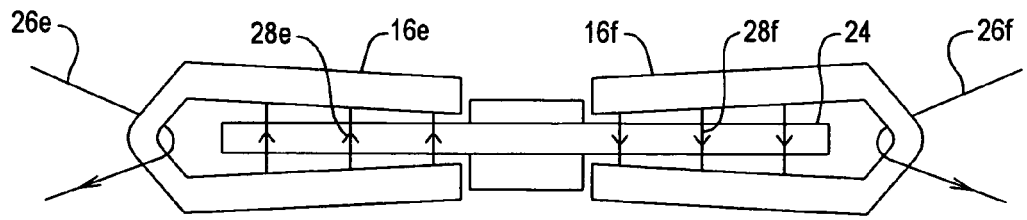
FIGS. 4A and 4B show a third configuration of an electromagnet in the apparatus of FIG. 1.
Figure 4B:
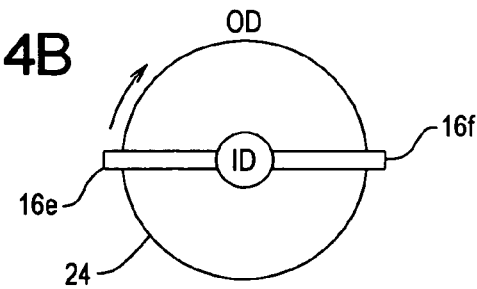

FIGS. 4A and 4B show a third configuration of the electromagnet 16 shown as electromagnets 16e and 16f. The electromagnets 16e and 16f are U-shaped magnets positioned near opposite minor surfaces of the disk 24 with poles that are parallel to the disk 24 and a gap between the poles that is occupied by the disk 24. The electromagnets 16e and 16f are coupled to coils 26e and 26f, respectively, and generate magnetic fields 28e and 28f, respectively, that are perpendicular to and extend through the disk 24. The electromagnets 16e and 16f cover a radial section of the disk 24 between the ID and the OD of the disk 24 and cover the entire width of the disk 24.

The first and second configurations of the electromagnet 16 can be modified to simultaneously erase multiple disks 24. The distance (open space) between the electromagnets 16a, 16b, 16c and 16d and the associated surfaces of the disk (or disks) 24 is 1 or 2 millimeters.

Figure 5:
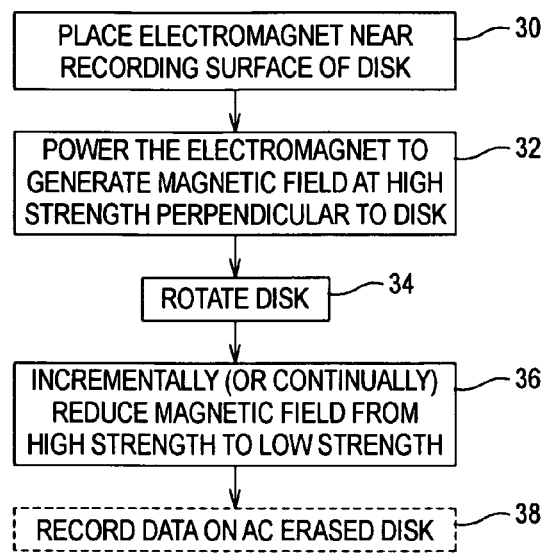
FIG. 5 shows a flowchart for demagnetizing a disk in the apparatus of FIG. 1 by AC bulk erase.

FIG. 5 shows a flowchart for demagnetizing the disk 24 in the apparatus 10 by AC bulk erase. The disk 24 is demagnetized as follows:

(a) The electromagnet 16 is placed near the recording surface of the disk 24 (step 30);

(b) The controller 12 applies a high current to the electromagnet 16 to generate an initial high strength magnetic field (such as 1 to 100 KGauss) that is perpendicular to and extends through the disk 24 and is based on and much higher than the magnetic coercivity of the disk 24 (step 32);

(c) The spin motor 20 rotates the disk 24 (step 34); and (d) The controller 12 gradually reduces (continuously or stepwise) the high current to essentially zero current while the disk 24 rotates, and consequently the magnetic field generated by the electromagnet 16 is gradually reduced from the high strength to a low strength that is essentially non-existent (zero), thereby AC erasing the disk 24 (step 36).

The rate of reduction of the magnetic field depends on the rotational speed the disk 24. The faster the rotational speed of the disk 24, the faster the rate of reduction of the magnetic field.

For example, the magnetic field is decremented to zero at one decrement per revolution of the disk 24. Thus, the time elapsed for each decrement is the same as the time elapsed for a revolution of the disk 24. For instance, if the disk 24 rotates at 10 msec per revolution then the magnetic field is decremented every 10 msec. As another example, the magnetic field is decremented to zero at approximately one decrement per revolution of the disk 24. Thus, the time elapsed for each decrement is approximately the time elapsed for a revolution of the disk 24. For instance, if the disk 24 rotates at 10 msec per revolution then the magnetic field is decremented marginally longer than every 10 msec. As yet another example, the magnetic field is decremented to zero more slowly than one decrement per revolution of the disk 24. Thus, the time elapsed for each decrement is greater than the time elapsed for a revolution of the disk 24. For instance, if the disk 24 rotates at 10 msec per revolution then the magnetic field is decremented every 20 msec.

After the disk 24 is AC erased, the disk 24 is assembled into a disk drive and then user data can be written to the disk 24 (step 38).

Figure 6:
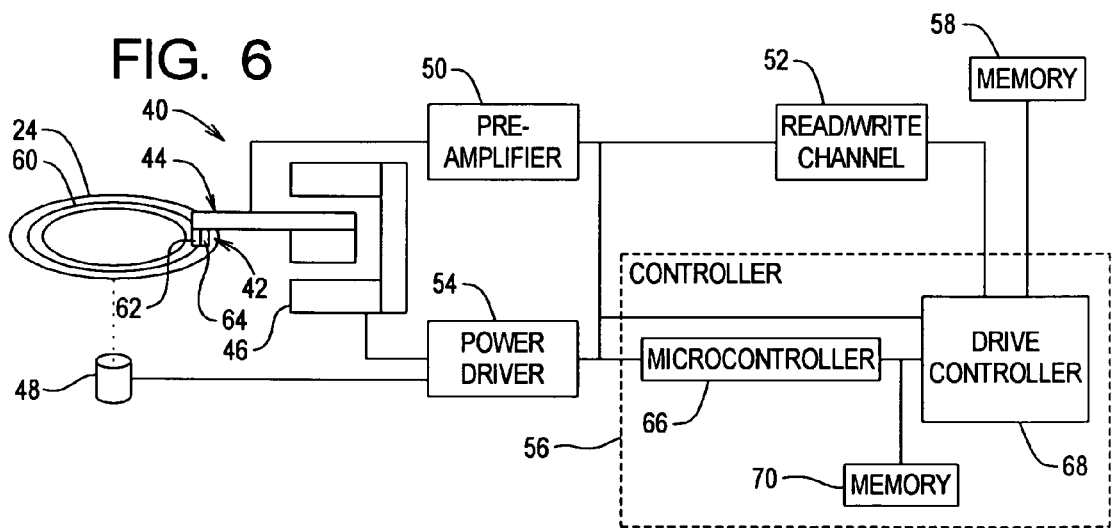
FIG. 6 shows a disk drive in which AC erase of a disk can be implemented.

FIG. 6 shows a disk drive 40 in which AC erase of the disk 24 can be implemented. The disk drive 40 includes the disk 24, a transducer head 42, an actuator assembly 44, a voice coil motor (VCM) 46, a spindle motor 48, a preamplifier 50, a read/write channel 52, a power driver 54, a controller 56 and a memory 58. The disk 24 includes tracks 60. The transducer head 42 includes a read element 62 and a write element 64. The controller 56 includes a microcontroller 66, a drive controller 68 and a memory 70.

The transducer head 42 uses the read element 62 and the write element 64 to read from and write to the disk 24. The actuator assembly 44 includes a support arm that supports the transducer head 42. The VCM 46 moves the actuator assembly 44 and thus the transducer head 42 across the tracks 60, and maintains the actuator arm 44 and thus the transducer head 42 over a target track 60. The spindle motor 48 rotates the disk 24.

The preamplifier 50 amplifies the readback and write signals from and to the disk 24. The read/write channel 52 encodes and decodes servo track numbers and data and converts servo burst amplitudes into digital values. The power driver 54 drives the VCM 46 and the spindle motor 48. The controller 56 interfaces with a host computer (not shown) and controls the operations of the disk drive 40. Within the controller 56, the microcontroller 66 controls the bias current for the transducer head 42, and the drive controller 68 generally controls the components of the disk drive 40. The memory 70 stores program instructions or data and can include RAM and/or non-volatile memory such as EEPROM, ROM, etc. The controller 56 or the memory 58 can include the AC erase function.

After the disk drive 40 is assembled, a recording frequency for the AC erase is determined. Next, the transducer head 42 performs the AC erase at the recording frequency on the disk 24 before writing any data on the disk 24. Thereafter, servo patterns and user data are written on the disk 24.

Figure 7:
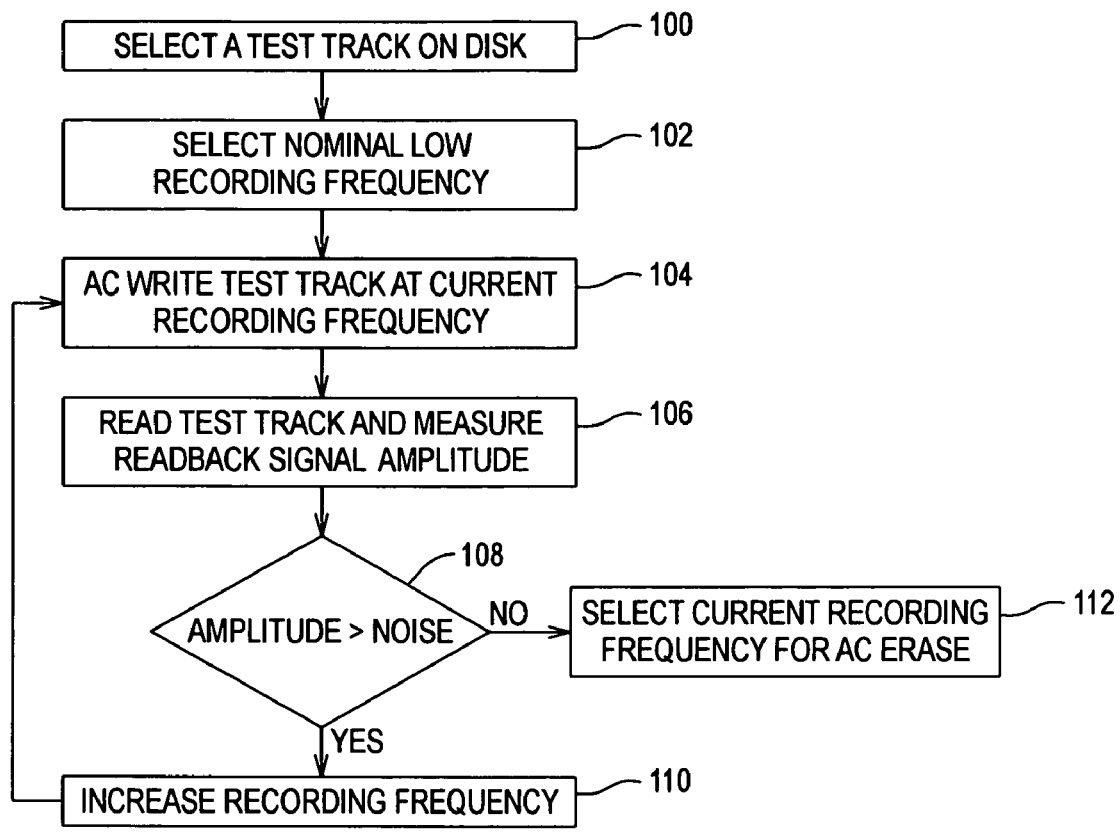
FIG. 7 shows a flowchart for determining a recording frequency for AC erase of a disk in the disk drive of FIG. 6.

FIG. 7 shows a flowchart for determining the recording frequency for the AC erase of the disk 24 in the disk drive 40. The transducer head 42 reads from and writes to the disk 24. The recording frequency is the write clock frequency and therefore the frequency of the bit transitions written to the disk 24. The noise level is the level at which the averaged amplitude of the readback signal remains relatively constant as the recording frequency increases. The recording frequency is determined as follows:

(a) Select a test track 60 on the disk 24 (for instance at the inner diameter (ID), the middle diameter (MD) or the outer diameter (OD) of the disk 24) (step 100);

(b) Set the recording frequency to a nominal low frequency (such as 50 to 100 MHz) (step 102);

(c) AC write the test track 60 at the current recording frequency (step 104);

(d) Read the test track 60 (after adjusting the radial position of the transducer head 42 by the radially offset distance between the read element 62 and the write element 64 so that the read element 62 rather than the write element 64 is positioned over the test track 60) and measure the amplitude of the readback signal generated from the test track 60 (step 106);

(e) Compare the amplitude of the readback signal with the noise level (the amplitude of the readback signal is reduced to the noise level when the amplitude of the readback signal remains relatively constant as the recording frequency increases) (step 108);

(f) Increase the recording frequency and repeat steps 104, 106 and 108 if the amplitude of the readback signal is greater than the noise level (step 110); and (g) Select the recording frequency at which the amplitude of the readback signal is reduced to the noise level as the recording frequency for the AC erase (step 112).

Thus, steps 104, 106 and 108 are repeated until the recording frequency is determined at step 112.

The AC erase is then performed on the tracks 60 on the disk 24 in the disk drive 40 by the transducer head 42 writing to the tracks 60 at the recording frequency at which the amplitude of the readback signal amplitude is reduced to the noise level.

The recording frequency can be scaled up or down to change the rotational speed (RPM) of the spindle motor 48, and thus the rotational speed of the disk 24, during the AC erase as long as the linear data density on the disk 24 is kept essentially constant. The AC erase is preferably performed on the area of the disk 24 that is intended for data storage.

The noise level may not be known before the recording frequency is determined. However, when the amplitude of the readback signal is relatively constant as the recording frequency increases, this indicates that the amplitude of the readback signal is the same as the noise level.

Although the disk drive 40 is shown with a single disk 24 and a single transducer head 42, the disk drive 40 can include multiple disks 24 and multiple transducer heads 42, and the recording frequency can be used to AC erase multiple disks 24 in the disk drive 40. Furthermore, the recording frequency can be used to AC erase multiple disk drives 40.

Although the disk drive 40 is described as determining the recording frequency, alternatively a spin-stand can determine the recording frequency using the disk 24 and the transducer head 42. Thereafter, the disk 24 and the transducer head 42 are assembled in the disk drive 40, and the disk drive 40 performs the AC erase using the recording frequency determined by the spin-stand.

Although the disk drive 40 is described as AC erasing the disk 24, alternatively the apparatus 10 can AC erase the disk 24. Thereafter, the disk 24 is assembled in the disk drive 40, and the disk drive 40 need not AC erase the disk 24.

Figure 8:
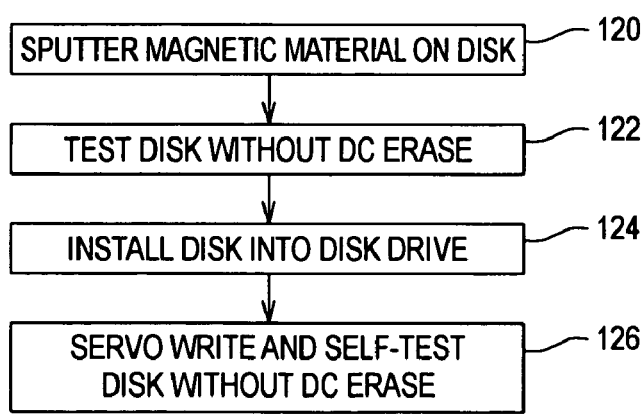
FIG. 8 shows a flowchart for demagnetizing a disk in the disk drive of FIG. 6 by omitting the DC erase.

FIG. 8 shows a flowchart for demagnetizing the disk 24 in the disk drive 40 by omitting the DC erase. From the time the magnetic material is sputtered on the disk 24 to the time, after the disk 24 is assembled in the disk drive 40, that the servo patterns are written on the disk 24, there is no DC erase of the disk 24. This preserves the demagnetized condition of the magnetic material of the disk 24 and alleviates timing asymmetry. The disk 24 is demagnetized as follows:

(a) Sputter the magnetic material on the disk 24 (step 120);

(b) Test the disk 24 without DC erasing the disk 24 (step 122);

(c) Install the disk 24 in the disk drive 40 (step 124); and (d) Servo write and self-test the disk 24 without DC erasing the disk 24 (step 126).

Figure 9:
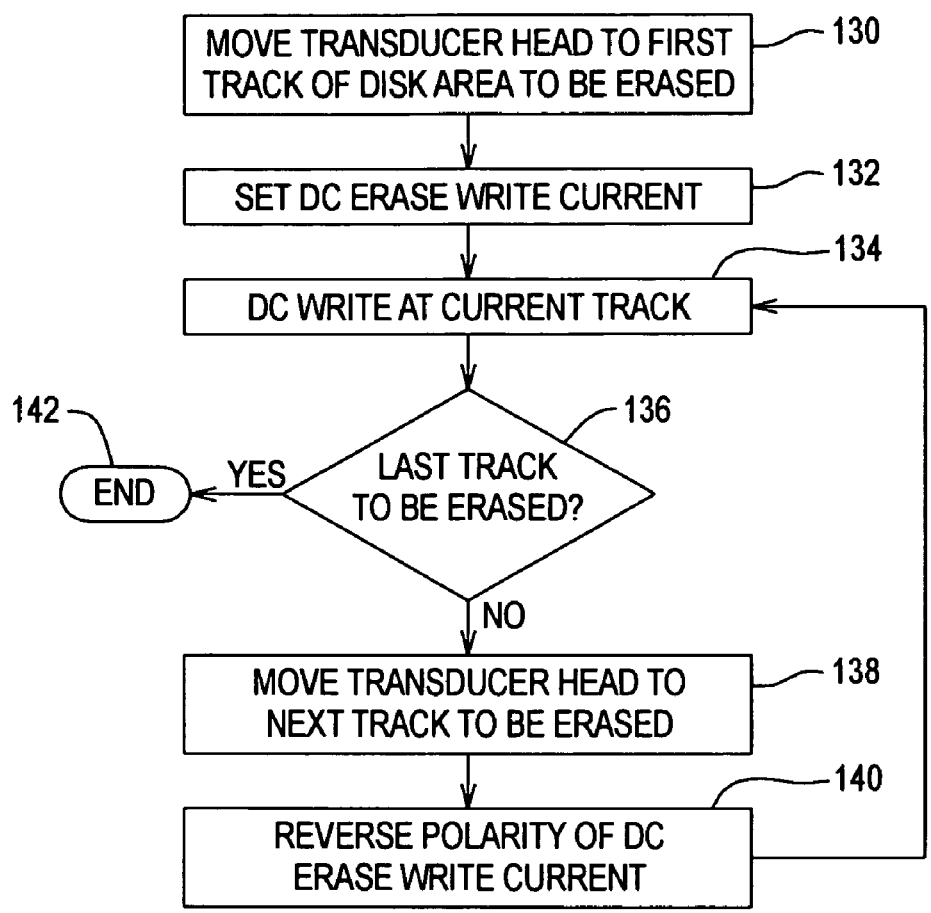
FIG. 9 shows a flowchart for demagnetizing a disk in the disk drive of FIG. 6 by DC erase with alternate polarity of the write current each time the transducer head is stepped.

FIG. 9 shows a flowchart for demagnetizing the disk 24 in the disk drive 40 by DC erase with alternate polarity of the write current each time the transducer head 42 is stepped (radially repositioned relative to the disk 24). The disk 24 is demagnetized as follows:

(a) Move the transducer head 42 to a first track 60 of an area of the disk 24 to be erased (step 130);

(b) Set the DC erase write current (such as 10 to 50 mA) for the transducer head 42 (step 132);

(c) DC erase (write) the current track 60 with the DC erase write current at a current polarity (step 134);

(d) Determine whether the current track 60 is the last track 60 to be erased (step 136);

(e) Move the transducer head 42 to the next track 60 if another track 60 remains to be erased (step 138); and (f) Reverse the polarity of the DC erase write current and repeat steps 134 and 136 (step 140).

Thus, steps 134, 136, 138 and 140 are repeated until the desired area of the disk 24 has been erased (step 142).

The transducer head 42 need not necessarily be stepped track-by-track. For example, the step size can be smaller than the track pitch.

Figure 10C:
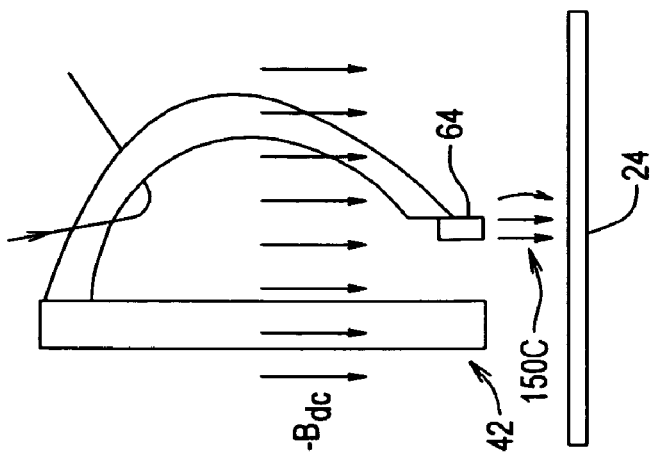
FIG. 10C shows a magnetic field from a transducer head in the disk drive of FIG. 6 due to −DC erase.
Figure 10B:
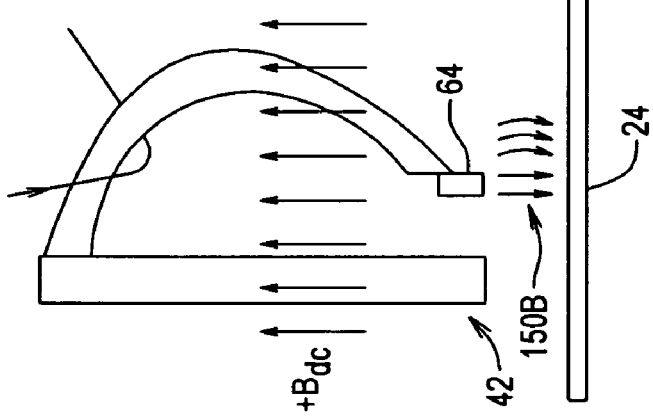
FIG. 10B shows a magnetic field from a transducer head in the disk drive of FIG. 6 due to +DC erase.
Figure 10A:
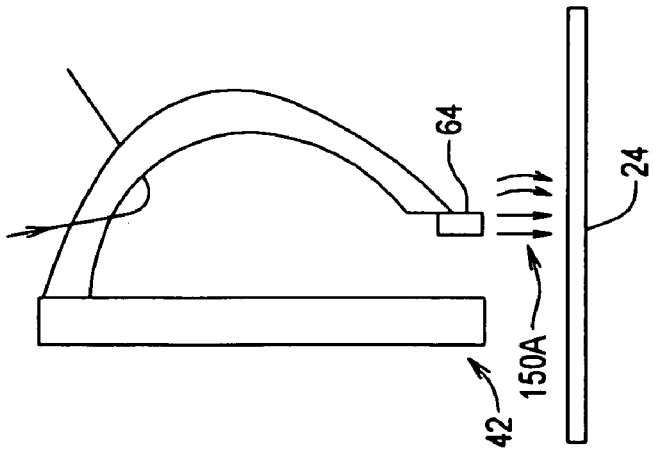
FIG. 10A shows a magnetic field from a transducer head in the disk drive of FIG. 6 due to AC erase.

FIG. 10A shows a magnetic field 150A from the transducer head 42 due to AC erase, FIG. 10B shows a magnetic field 150B from the transducer head 42 due to +DC erase, and FIG. 10C shows a magnetic field 150C from the transducer head 42 due to −DC erase. The magnetic fields 150A, 150B and 150C are generated by the write element 64 as the transducer head 42 writes to the disk 24. The magnetic field 150A occurs as the disk drive 40 performs AC erase on the disk 24, and the magnetic fields 150B and 150C occur as the disk drive 40 performs +DC erase and −DC erase, respectively, on the disk 24 with alternate polarity of the write current each time the transducer head 42 is stepped. The magnetic field 150A is represented by two vertical arrows and two curved arrows, the magnetic field 150B is represented by two vertical arrows and three curved arrows, and the magnetic field 150C is represented by two vertical arrows and one curved arrow. Furthermore, the arrows represent a bubble where the transducer head 42 writes to the disk 24.

When the disk 24 is preconditioned with +DC erase only or with −DC erase only (depending on the direction of the write current), transition shift occurs. For example, when the disk 24 is preconditioned with +DC erase only, the magnetic bubble increases (the number of curved arrows increase), causing the written transitions to expand, and in turn causing transition shift. Likewise, when the disk 24 is preconditioned with −DC erase only, the magnetic bubble decreases (the number of curved arrows decrease), causing the written transitions to contract, and in turn causing transition shift.

When the disk 24 is preconditioned with alternate +DC erase and −DC erase as the transducer head 42 is stepped, the $+B_{dc}$ magnetic field cancels the $-B_{dc}$ magnetic field and the net effect is similar to the AC erase.

Figure 11A:
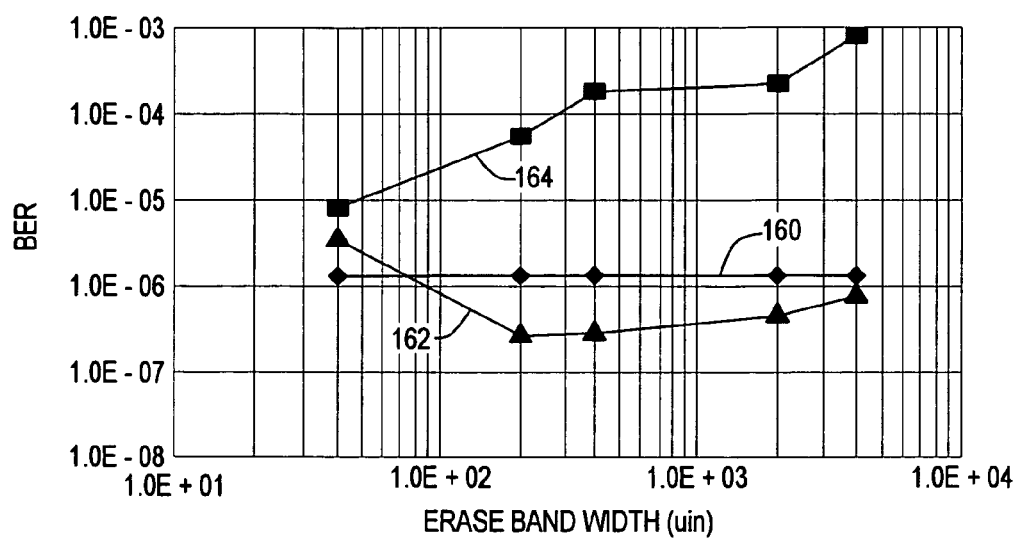
FIG. 11A shows comparative plots of BER as a function of erase band width for AC band erase and DC band erase.

FIG. 11A shows comparative plots of BER as a function of erase band width for AC band erase 160, +DC band erase 162 and −DC band erase 164. AC band erase 160 is according to the present invention, whereas +DC band erase 162 and −DC band erase 164 are conventional. The band erases 160, 162 and 164 are written to a disk, then tracks are written to the disk, and then the BER in a readback signal from the tracks is measured. As is seen, the AC band erase 160 has no appreciable impact on the BER, whereas the DC band erases 162 and 164 have a large impact on the BER.

Figure 11B:
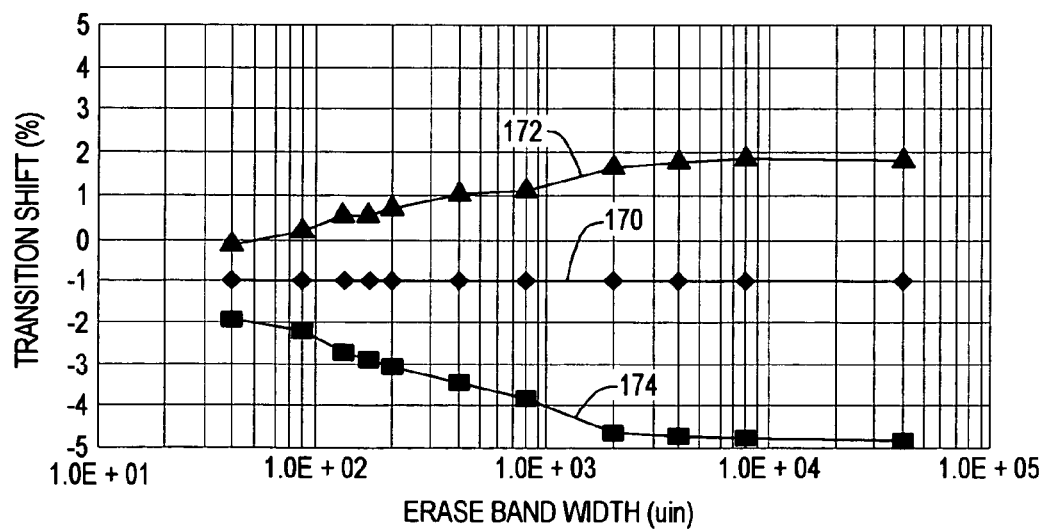
FIG. 11B shows comparative plots of transition shift as a function of erase band width for AC band erase and DC band erase.

FIG. 11B shows comparative plots of transition shift as a function of erase band width for AC band erase 170, +DC band erase 172 and −DC band erase 174. AC band erase 170 is according to the present invention, whereas +DC band erase 172 and −DC band erase 174 are conventional. The band erases 170, 172 and 174 are written to a disk, then tracks are written to the disk, and then the transition shift is measured. As is seen, the AC band erase 170 has no appreciable impact on the transition shift, whereas the DC band erases 172 and 174 have a large impact on the transition shift.

Figure 12A:
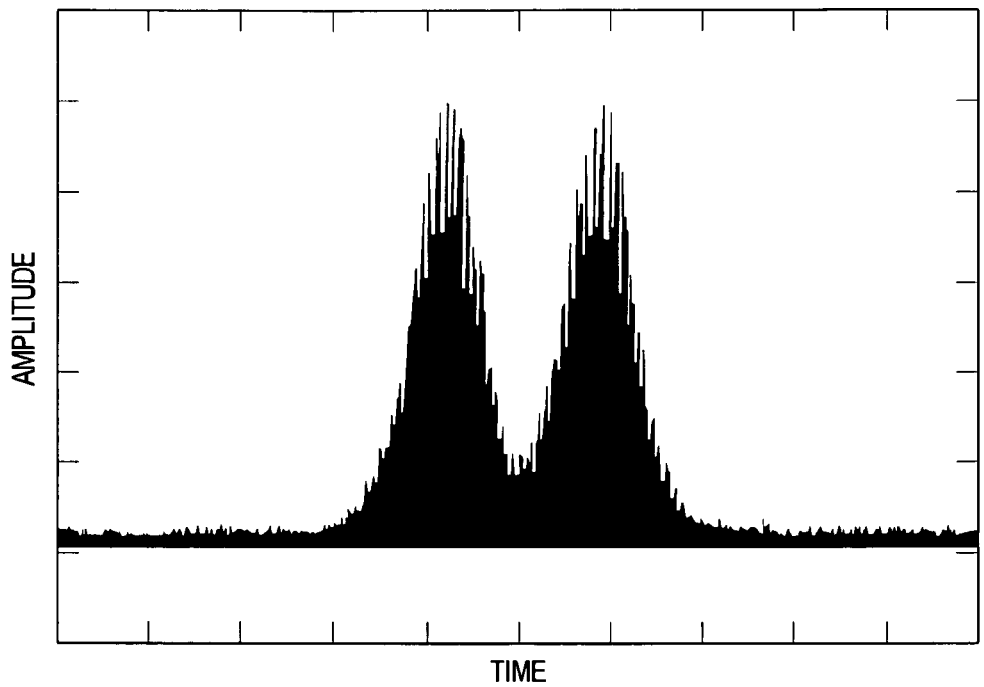
FIG. 12A shows a readback signal timing histogram of differentiated data written on a disk after a conventional DC band erase.

FIG. 12A shows a readback signal timing histogram of differentiated data written after a conventional DC band erase. The two peaks correspond to the different lengths of the positive and negative bit cells, which indicates bit shift and timing asymmetry.

Figure 12B:
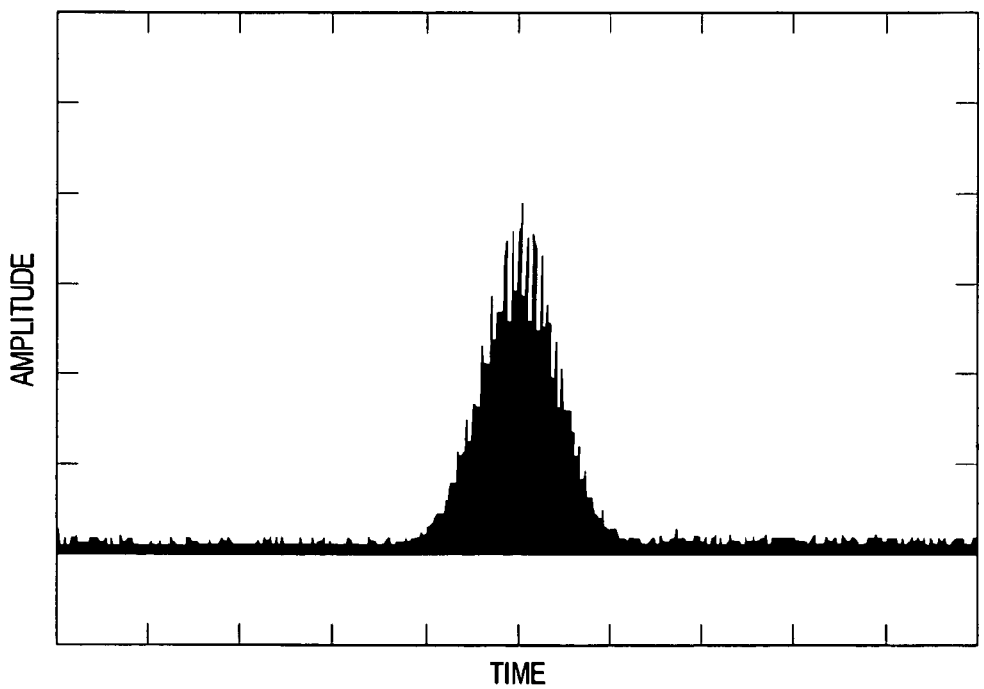
FIG. 12B shows a readback signal timing histogram of data written on a disk with as-received sputtered magnetic material.

FIG. 12B shows a readback signal timing histogram of data written on a disk with as-received sputtered magnetic material. The magnetic material is sputtered without any net magnetization, the demagnetized condition of the magnetic material is preserved, and timing asymmetry is eliminated.

Figure 12C:
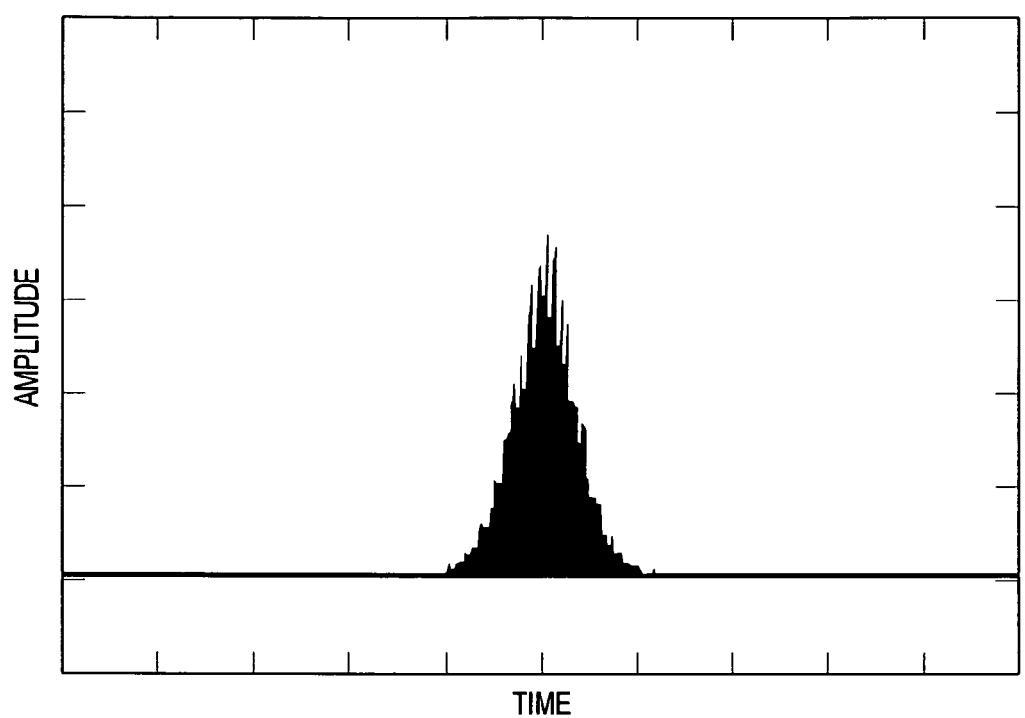
FIG. 12C shows a readback signal timing histogram of data written on a disk after alternate +DC erase and −DC erase as a transducer head is stepped.

FIG. 12C shows a readback signal timing histogram of data written on a disk after alternate +DC erase and −DC erase as a transducer head is stepped. Timing asymmetry is eliminated.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of demagnetizing magnetic media for recording data in a data storage device, comprising the steps of:
    (a) placing the magnetic media in a magnetic field at a first strength level; and
    (b) gradually reducing the magnetic field to a second strength level by multiple stepwise decrements, to essentially eliminate net magnetization in the magnetic media, wherein the magnitude of each decrement is based on the magnetic coercivity of the magnetic media.

2. A method of demagnetizing magnetic media for recording data in a data storage device, comprising the steps of:
    (a) placing the magnetic media in a magnetic field at a first strength level, wherein the first strength level is based on the magnetic coercivity of the magnetic media; and
    (b) gradually reducing the magnetic field to a second strength level by multiple stepwise decrements, to essentially eliminate net magnetization in the magnetic media.

3. A method of demagnetizing magnetic media for recording data in a data storage device, comprising the steps of:
    (a) placing the magnetic media in a magnetic field at a first strength level; and
    (b) gradually reducing the magnetic field to a second strength level by multiple stepwise decrements, to essentially eliminate net magnetization in the magnetic media, wherein the second strength level is substantially zero.

4. A method of demagnetizing magnetic media for recording data in a data storage device, comprising the steps of:
    (a) placing the magnetic media in a magnetic field at a first strength level, wherein the magnetic field is substantially perpendicular to the magnetic media and the first strength level is based on the magnetic coercivity of the magnetic media; and
    (b) gradually reducing the magnetic field to a second strength level by multiple stepwise decrements, to essentially eliminate net magnetization in the magnetic media, wherein the magnitude of each decrement is based on the magnetic coercivity of the magnetic media and the second strength level is substantially zero.

5. The method of claim 2, wherein:
    step (a) further includes the steps of:
        positioning an electromagnet proximate to the magnetic media; and
        providing electrical power to the electromagnet to generate the magnetic field at the first strength level; and
    step (b) further includes the step of gradually reducing the electrical power to the electromagnet to gradually reduce the magnetic field to the second strength level.

6. A method of demagnetizing a magnetic data disk for recording data in a disk drive, comprising the steps of:
    (a) placing the disk in a magnetic field at a first strength level; and
    (b) gradually reducing the magnetic field to a second strength level by multiple stepwise decrements, to essentially eliminate net magnetization in the disk, wherein the stepwise decrements are separated by predetermined time periods and the duration of each time period is based on the speed of rotation of the disk.

7. A method of demagnetizing a magnetic data disk for recording data in a disk drive, comprising the steps of:
    (a) placing the disk in a magnetic field at a first strength level; and
    (b) gradually reducing the magnetic field to a second strength level by multiple stepwise decrements, to essentially eliminate net magnetization in the disk, wherein the stepwise decrements are separated by predetermined time periods and the duration of each time period is longer than the duration of a revolution of the disk.

8. A method of demagnetizing a magnetic data disk for recording data in a disk drive, comprising the steps of:
(a) placing the disk in a magnetic field at a first strength level; and
(b) gradually reducing the magnetic field to a second strength level by multiple stepwise decrements, to essentially eliminate net magnetization in the disk, wherein the magnitude of each decrement is based on the magnetic coercivity of the disk.

9. A method of demagnetizing a magnetic data disk for recording data in a disk drive, comprising the steps of:
(a) placing the disk in a magnetic field at a first strength level, wherein the disk includes opposing surfaces;
(b) placing electromagnets proximate each surface of the disk such that at least a portion of each surface of the disk is between the electromagnets;
(c) providing electrical power to the electromagnets to generate the magnetic field at the first strength level;
(d) rotating the disk in relation to the electromagnets such that the magnetic field is substantially perpendicular to the surfaces of the disk; and
(e) gradually reducing the magnetic field to a second strength level by multiple stepwise decrements, to essentially eliminate net magnetization in the disk, wherein the stepwise decrements are separated by predetermined time periods, the duration of each time period is based on the speed of rotation of the disk and the magnetic field is substantially perpendicular to the surfaces of the disk.

10. The method of claim 9, wherein step (e) further includes the step of moving the electromagnets essentially radially in relation to the disk to expose a recording area on the surfaces of the disk to the magnetic field.

11. An apparatus for demagnetizing a magnetic data disk for recording data in a data storage device, comprising:
an electromagnet which generates a magnetic field when provided with electrical power;
a first support for positioning the disk proximate to the electromagnet such that the magnetic field overlaps at least a portion of the disk; and
a controller for selectively providing electrical power to the electromagnet to generate the magnetic field at different strength levels, wherein the controller gradually reduces the electrical power from a first power level to a second power level, to reduce the magnetic field from a first strength level to a second strength level by multiple stepwise decrements, to essentially eliminate net magnetization in the disk, wherein the stepwise decrements are separated by predetermined time periods and the duration of each time period is longer than the duration of a revolution of the disk.

12. An apparatus for demagnetizing magnetic media for recording data in a data storage device, comprising:
an electromagnet which generates a magnetic field when provided with electrical power;
a first support for positioning the magnetic media proximate to the electromagnet such that the magnetic field overlaps at least a portion of the magnetic media; and
a controller for selectively providing electrical power to the electromagnet to generate the magnetic field at different strength levels, wherein the controller gradually reduces the electrical power from a first power level to a second power level, to reduce the magnetic field from a first strength level to a second strength level by multiple stepwise decrements, to essentially eliminate net magnetization in the magnetic media, wherein the magnitude of each decrement is based on the magnetic coercivity of the magnetic media.

13. An apparatus for demagnetizing a magnetic data disk for recording data in a data storage device, comprising:
an electromagnet which generates a magnetic field when provided with electrical power;
a first support for positioning the disk proximate to the electromagnet such that the magnetic field overlaps at least a portion of the disk; and
a controller for selectively providing electrical power to the electromagnet to generate the magnetic field at different strength levels, wherein the controller gradually reduces the electrical power from a first power level to a second power level, to reduce the magnetic field from a first strength level to a second strength level by multiple stepwise decrements, to essentially eliminate net magnetization in the disk, wherein the stepwise decrements are separated by predetermined time periods, the duration of each time period is longer than the duration of a revolution of the disk, the magnitude of each decrement is based on the magnetic coercivity of the disk and the magnetic field is substantially perpendicular to the disk.

14. An apparatus for demagnetizing a magnetic data disk for recording data in a data storage device, comprising:
an electromagnet which generates a magnetic field when provided with electrical power;
a first support for positioning the disk proximate to the electromagnet such that the magnetic field overlaps at least a portion of the disk;
a second support for moving the electromagnet essentially radially in relation to the disk to expose a recording area on the disk to the magnetic field; and
a controller for selectively providing electrical power to the electromagnet to generate the magnetic field at different strength levels, wherein the controller gradually reduces the electrical power from a first power level to a second power level, to reduce the magnetic field from a first strength level to a second strength level by multiple stepwise decrements, to essentially eliminate net magnetization in the recording area of the disk and the magnitude of each decrement is based on the magnetic coercivity of the disk.

15. A method of demagnetizing magnetic media for recording data in a data storage device, comprising the steps of:
(a) placing the magnetic media in a magnetic field at a first strength level; and
(b) gradually reducing the magnetic field to a second strength level to essentially eliminate net magnetization in the magnetic media;
wherein at least one of the first and second strength levels is based on the magnetic coercivity of the magnetic media.

16. The method of claim 15, wherein in step (b) the magnetic field is gradually reduced from the first strength level to the second strength level based on the magnetic coercivity of the magnetic media.

17. A method of demagnetizing a magnetic data disk for recording data in a disk drive, comprising the steps of:
(a) placing the disk in a magnetic field at a first strength level; and
(b) gradually reducing the magnetic field to a second strength level to essentially eliminate net magnetization in the disk;
wherein at least one of the first and second strength levels is based on the magnetic coercivity of the disk.

18. The method of claim 17, wherein in step (b) the magnetic field is gradually reduced from the first strength level to the second strength level based on the magnetic coercivity of the disk.

19. An apparatus for demagnetizing magnetic media for recording data in a data storage device, comprising:
an electromagnet which generates a magnetic field when provided with electrical power;
a first support for positioning the magnetic media proximate to the electromagnet such that the magnetic field overlaps at least a portion of the magnetic media; and
a controller for selectively providing electrical power to the electromagnet to generate the magnetic field at different strength levels, wherein the controller gradually reduces the electrical power from a first power level to a second power level, to reduce the magnetic field from a first strength level to a second strength level, to essentially eliminate net magnetization in the magnetic media;
wherein at least one of the first and second strength levels is based on the magnetic coercivity of the magnetic media.

20. The apparatus of claim 19, wherein the controller reduces the magnetic field from the first strength level to the second strength level based on the magnetic coercivity of the magnetic media.

21. A method of demagnetizing a magnetic data disk for recording data in a disk drive, comprising the steps of:
placing the disk in a magnetic field at a first strength level; and
reducing the magnetic field from the first strength level to a second strength level while rotating the disk to essentially eliminate net magnetization in a recording area of the disk, wherein the rate of reducing the magnetic field is based on the rotational speed of the disk.

22. The method of claim 21, wherein the first strength level is higher than the magnetic coercivity of the disk.

23. The method of claim 21, wherein the second strength level is substantially zero.

24. The method of claim 21, wherein the first strength level is higher than the magnetic coercivity of the disk and the second strength level is substantially zero.

25. The method of claim 21, wherein the magnetic field is substantially perpendicular to the disk.

26. The method of claim 21, wherein the magnetic field provides an AC erase for the recording area of the disk.

27. The method of claim 26, wherein the AC erase is a bulk erase.

28. The method of claim 26, wherein the AC erase is a track-by-track erase.

29. The method of claim 21, wherein the magnetic field is reduced from the first strength level to the second strength level continuously.

30. The method of claim 21, wherein the magnetic field is reduced from the first strength level to the second strength level by multiple stepwise decrements.

31. The method of claim 30, wherein the stepwise decrements are separated by predetermined time periods.

32. The method of claim 31, wherein the duration of each time period is the same as the duration of a revolution of the disk.

33. The method of claim 31, wherein the duration of each time period is longer than the duration of a revolution of the disk.

34. The method of claim 31, wherein the duration of each time period is longer than the duration of a revolution of the disk and shorter than the duration of two revolutions of the disk.

35. The method of claim 31, wherein the duration of each time period is marginally longer than the duration of a revolution of the disk and shorter than the duration of two revolutions of the disk.

36. The method of claim 31, wherein the duration of each time period is the same as the duration of two revolutions of the disk.

37. The method of claim 31, wherein the magnitude of each decrement is based on the magnetic coercivity of the disk.

38. The method of claim 21, wherein the rate of reducing the magnetic field is based on a monitored rotational speed of the disk.

39. The method of claim 21, wherein the rate of reducing the magnetic field is based on a predetermined rotational speed of the disk.

40. The method of claim 21, wherein the rate of reducing the magnetic field increases as the rotational speed of the disk increases.

41. The method of claim 21, including reducing the magnetic field from the first strength level to a second strength level while rotating the disk to essentially eliminate net magnetization in the disk.

42. The method of claim 21, including demagnetizing the disk before assembling the disk in the disk drive.

43. The method of claim 21, including demagnetizing the disk after assembling the disk in the disk drive.

44. The method of claim 21, including demagnetizing the disk using first and second electromagnets, wherein the disk includes first and second opposing surfaces, the first and second electromagnets each include first and second poles and a gap therebetween, the first electromagnet is positioned proximate to the first surface and not the second surface, the second electromagnet is positioned proximate to the second surface and not the first surface, the disk is spaced from the gaps, the magnetic field flows between the first poles across the disk and between the second poles across the disk, and the poles extend across the width of the disk between the inner and outer diameters of the disk and are stationary as the disk is demagnetized.

45. The method of claim 21, including demagnetizing the disk using first and second electromagnets, wherein the disk includes first and second opposing surfaces, the first and second electromagnets each include first and second poles and a gap therebetween, the first electromagnet is positioned proximate to the first surface and not the second surface, the second electromagnet is positioned proximate to the second surface and not the first surface, the disk is spaced from the gaps, the magnetic field flows between the first poles across the disk and between the second poles across the disk, and the poles extend across less than the width of the disk between the inner and outer diameters of the disk and are moved essentially radially in relation to the disk as the disk is demagnetized.

46. The method of claim 21, including demagnetizing the disk using first and second electromagnets, wherein the disk includes first and second opposing surfaces, the first and second electromagnets each include first and second poles and a gap therebetween, the first electromagnet is positioned proximate to the first and second surfaces, the second electromagnet is positioned proximate to the first and second surfaces, the disk extends into the gaps, the magnetic field flows between the poles of the first electromagnet across the disk and between the poles of the second electromagnet across the disk, and the poles extend across the width of the disk between the inner and outer diameters of the disk.

47. The method of claim 21, including demagnetizing the disk using a spin stand.

48. The method of claim 21, including demagnetizing the disk using a transducer head of the disk drive.

49. The method of claim 21, including writing servo patterns to the disk after demagnetizing the disk.

50. The method of claim 21, excluding writing data to the disk before demagnetizing the disk.

51. A method of demagnetizing a magnetic data disk for recording data in a disk drive, comprising the steps of:
placing the disk in a magnetic field at a first strength level; and
reducing the magnetic field from the first strength level to a second strength level while rotating the disk to essentially eliminate net magnetization in a recording area of the disk, wherein the magnetic field is substantially perpendicular to the disk and provides an AC erase for the recording area of the disk and the rate of reducing the magnetic field is based on the rotational speed of the disk.

52. The method of claim 51, wherein the first strength level is higher than the magnetic coercivity of the disk and the second strength level is substantially zero.

53. The method of claim 51, wherein the AC erase is a bulk erase.

54. The method of claim 51, wherein the AC erase is a track-by-track erase.

55. The method of claim 51, wherein the magnetic field is reduced from the first strength level to the second strength level continuously.

56. The method of claim 51, wherein the magnetic field is reduced from the first strength level to the second strength level by multiple stepwise decrements and the stepwise decrements are separated by predetermined time periods.

57. The method of claim 56, wherein the duration of each time period is the same as the duration of a revolution of the disk.

58. The method of claim 56, wherein the duration of each time period is longer than the duration of a revolution of the disk.

59. The method of claim 56, wherein the duration of each time period is longer than the duration of a revolution of the disk and shorter than the duration of two revolutions of the disk.

60. The method of claim 56, wherein the duration of each time period is marginally longer than the duration of a revolution of the disk and shorter than the duration of two revolutions of the disk.

61. The method of claim 56, wherein the duration of each time period is the same as the duration of two revolutions of the disk.

62. The method of claim 56, wherein the magnitude of each decrement is based on the magnetic coercivity of the disk.

63. The method of claim 51, wherein the rate of reducing the magnetic field is based on a monitored rotational speed of the disk.

64. The method of claim 51, wherein the rate of reducing the magnetic field is based on a predetermined rotational speed of the disk.

65. The method of claim 51, wherein the rate of reducing the magnetic field increases as the rotational speed of the disk increases.

66. The method of claim 51, including reducing the magnetic field from the first strength level to a second strength level while rotating the disk to essentially eliminate net magnetization in the disk.

67. The method of claim 51, including demagnetizing the disk before assembling the disk in the disk drive.

68. The method of claim 51, including demagnetizing the disk after assembling the disk in the disk drive.

69. The method of claim 51, including writing servo patterns to the disk after demagnetizing the disk.

70. The method of claim 51, excluding writing data to the disk before demagnetizing the disk.

* * * * *